(12) United States Patent
Mandagere et al.

(10) Patent No.: US 8,037,349 B2
(45) Date of Patent: Oct. 11, 2011

(54) DATA REPLICATION BASED ON CAPACITY OPTIMIZATION

(75) Inventors: Nagapramod S. Mandagere, San Jose, CA (US); Seshashayee S. Murthy, Somers, NY (US); Mark A. Smith, San Jose, CA (US); Sandeep M. Uttamchandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 12/549,847

(22) Filed: Aug. 28, 2009

(65) Prior Publication Data
US 2011/0055621 A1 Mar. 3, 2011

(51) Int. Cl.
*G06F 11/00* (2006.01)
(52) U.S. Cl. .......................... 714/6.3; 714/6.2
(58) Field of Classification Search .......... 714/6.2, 714/6.3
See application file for complete search history.

(56) References Cited

U.S. PATENT DOCUMENTS

| | | | |
|---|---|---|---|
| 7,065,619 B1 | 6/2006 | Zhu et al. | |
| 7,236,973 B2 | 6/2007 | Kalthoff et al. | |
| 7,624,335 B1 * | 11/2009 | Maheshwari et al. | 714/807 |
| 7,634,657 B1 * | 12/2009 | Stringham | 713/168 |
| 2008/0244172 A1 | 10/2008 | Kano | |
| 2008/0244204 A1 * | 10/2008 | Cremelie et al. | 711/162 |
| 2009/0254507 A1 * | 10/2009 | Hosoya et al. | 706/48 |
| 2010/0250858 A1 * | 9/2010 | Cremelie et al. | 711/136 |
| 2011/0016095 A1 * | 1/2011 | Anglin et al. | 707/692 |
| 2011/0022566 A1 * | 1/2011 | Beaverson et al. | 707/639 |
| 2011/0055621 A1 * | 3/2011 | Mandagere et al. | 714/4 |

OTHER PUBLICATIONS

Bolosky, et al. Single Instance Storage in Windows(R) 2000. In Proceedings of the 4th USENIX Windows Systems Symposium, 2000. 12 pages.
Douglis, et al. Application-specific Delta-encoding via Resemblance Detection. USENIX Annual Technical Conference, 2003. 14 pages.
EMC Avamar Software Extends De-Duplication Capabilities to Virtual Machines and NAS Systems. [online]. 2 pages. [retrieved on Aug. 26, 2009]. Retrieved from the Internet< URL: http://www.emc.com/about/news/press/us/2007/05212007-5092.htm>.
FalconStor. [online]. 2 pages. [retrieved on Aug. 26, 2009]. Retrieved from the Internet:< URL: http://www.falconstor.com/en/pages/index.cfm?pn=VTL&gclid=CLqA4ZbxoZYCFQKaF QodMHiR6g &bhcp=1>.
IBM. Distributed Data Deduplication Using Storage Agents. IP.com PriorArtDatabase No. IPCOM000169428D. Apr. 15, 2008. 2 pages.

(Continued)

*Primary Examiner* — Joshua Lohn
(74) *Attorney, Agent, or Firm* — Schmeiser, Olsen & Watts; Anna L. Linne

(57) ABSTRACT

A system and associated method for replicating data based on capacity optimization. A local node receives the data associated with a key. The local node within a local domain communicates with nodes of remote domains in a system through a communication network. Each domain has its own distributed hash table that partitions key space and assigns a certain key range to an owner node within the domain. For new data, the local node queries owner nodes of domains in the system progressively from the local domain to remote domains for a duplicate of the new data. Depending on a result returned by owner nodes and factors for replication strategies, the local node determines a replication strategy and records the new data in the local node pursuant to the replication strategy.

20 Claims, 10 Drawing Sheets

OTHER PUBLICATIONS

MacDonald, Joshua P. File System Support for Delta Compression. Master's Thesis. UC Berkeley. (2000) 32 pages.

Muthitacharoen, et al. A Low-bandwidth Network File System. Proceedings of 18th Symposium on Operating Systems Principles. Banff, Canada. Oct. 2001. 14 pages.

Policroniades, et al. Alternatives for Detecting Redundancy in Storage Systems Data. USENIX Association: Proceedings of the General Track: 2004 USENIX Annual Technical Conference. Boston, MA. Jun. 27-Jul. 2, 2004. 15 pages.

Quinlan, et al. Venti: a new approach to archival storage. Proceedings of the Conference on File and Storage Technologies, 2002. 13 pages.

Wendt, Jerome M. The Juxtaposition of Deduplication and Replication Needed for Global Data Protection. [online]. 4 pages. [retrieved on Aug. 26, 2009]. Retrieved from the Internet:< URL: http://necam.dciginc.com/2008/06/the-juxtaposition-of-deduplica.html>.

You, et al. Deep Store: An Archival Storage System Architecture. Proceedings of the 21st International Conference on Data Engineering (ICDE), 2005. IEEE. 12 pages.

You, et al. Evaluation of Efficient Archival Storage Techniques. Proceedings of the 21st IEEE / 12th NASA Goddard Conference on Mass Storage Systems and Technologies, Apr. 2004. 6 pages.

Zhu, et al. Avoiding the Disk Bottleneck in the Data Domain Deduplication File System. USENIX Association: FAST '08: 6th USENIX Conference on File and Storage Technologies. pp. 269-282.

\* cited by examiner

DATA REPLICATION BASED ON CAPACITY OPTIMIZATION

BACKGROUND OF THE INVENTION

The present invention discloses a system and associated method for data replication based on capacity optimization utilizing existing replicas. Due to the increase in the amount of data in computing environment and business enterprises, data replication requires mechanisms to reduce data footprint, intra-file and inter-file data redundancy while providing sufficient resiliency to recover the data in cases of failure. Conventional data replication generates multiple unnecessary replicas of the data within a site that is the same as the data and/or across multiples sites.

BRIEF SUMMARY

According to one embodiment of the present invention, a method for replicating data based on capacity optimization comprises a local node receiving the data in an extent configured for a system, the extent being associated with a key for indexing, wherein the system comprises at least one domain coupled to a communication network, wherein each domain of said at least one domain comprises at least one node and a respective distributed hash table (DHT) for said each domain, wherein each node of said at least one node comprises a respective storage array storing respective primary data and respective replicas of selected data stored in the respective primary data of said at least one node; determining, by a processor of a computer in which the local node operates, that the received extent does not exist in primary data of the local node; querying said at least one domain in the system for a duplicate of the extent by use of the respective DHT for said each domain such that only a respective owner node is queried for the duplicate of the extent within said each domain, wherein the respective owner node of said each domain owns a key range in which the key associated with the extent falls in; determining a replication strategy based on factors and a result from said querying, wherein said replication strategy is selected from the group consisting of establishing replica relationship among existing duplicates, creating a new remote duplicate, and creating a new local duplicate; and recording the extent into said primary data of the local node by updating a local hash table and extent metadata of the local node.

According to one embodiment of the present invention, a computer program product comprises a computer readable memory unit that embodies a computer readable program code. The computer readable program code contains instructions that, when executed by a processor of a computer system, implement a method for replicating data based on capacity optimization.

According to one embodiment of the present invention, a computer system comprises a processor and a computer readable memory unit coupled to the processor, wherein the computer readable memory unit containing instructions that, when executed by the processor, implement a method for replicating data based on capacity optimization.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for replicating data based on capacity optimization.

DETAILED DESCRIPTION

Figure 1:
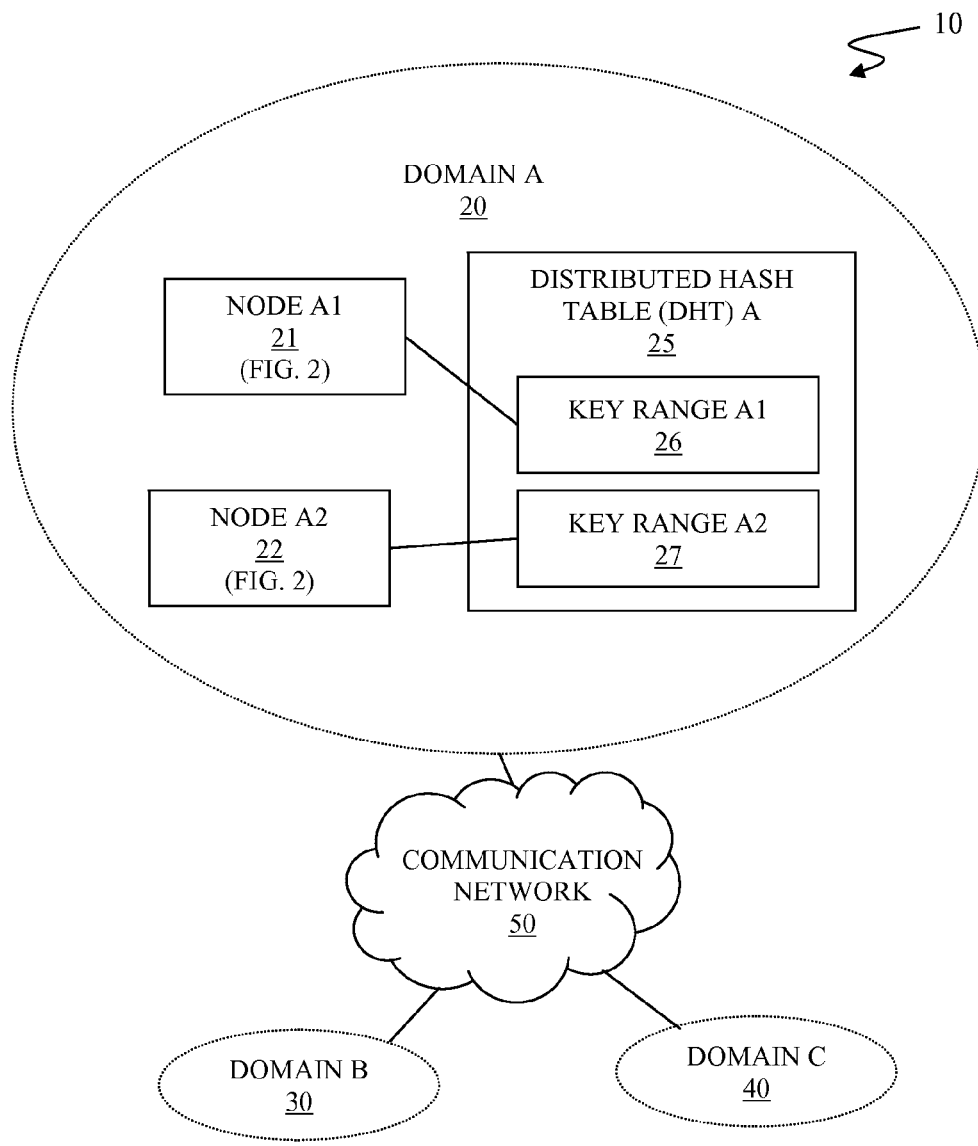
FIG. 1 illustrates a system for data replication based on capacity optimization, in accordance with embodiments of the present invention.

FIG. 1 illustrates a system 10 for data replication based on capacity optimization, in accordance with embodiments of the present invention.

The system 10 comprises multiple disjoint domains coupled to a communication network 50. The multiple disjoint domains comprise a domain A 20, a domain B 30, and a domain C 40. In this specification, a domain is a group of nodes in a same predefined category such as geographic proximity, maintenance policy, etc. The domain A 20 comprises multiple nodes and a distributed hash table A 25. The multiple nodes of the domain A 20 comprise a node A1 21 and a node A2 22.

The node A1 21 and the node A2 22 represent a respective data center in the domain A 20. Each node in the domain A 20 performs data replication based on capacity optimization. See descriptions of FIG. 2, infra, for components of a node in the system 10. In this specification, the term "capacity optimization" is used interchangeably with the term "opportunistic deduplication" or simply "deduplication," all of which define a mechanism for minimizing the number of replicas within the system 10 by utilizing existing duplicates of specific data or such minimization of replicas. In this specification, the term "opportunistic replica" is defined as a pre-existing duplicate of incoming data to be replicated as opposed to a deliberately created replica.

The domain B 30 and the domain C 40 also comprise multiple nodes and a respective distributed hash table that are analogous to the domain A 20. The distributed hash tables (DHTs) of all domains 20, 30, 40 collectively establishes a class of decentralized distributed systems that provide a data lookup service similar to a hash table using keys to find values. A hash key space used in the data lookup service is partitioned into multiple key ranges of the DHTs. The key ranges are common to all domains in the system 10. The DHTs store (keyrange, node) pairs in a respective domain that represent how each key range in the hash key space is assigned to a respective node in the respective domain. The respective node is responsible for maintaining mappings from keys to values for the keys within the assigned key range. Such responsible node is referred to as an owner node of the assigned key range in the respective domain. In this specification, the terms "hash key" and "key" are used interchangeably.

The distributed hash table A 25 is a distributed hash table (DHT) of the domain A 20. Each domain in the system 10 has a corresponding distributed hash table within the respective domain. Hash keys for extents from all nodes in the system 10 are represented within the key ranges of the distributed hash table A 25. In the system 10, the hash key space is partitioned into a key range A1 26 and a key range A2 27. The key range A1 26 is assigned to the node A1 21 within the domain A 20. The node A1 21 is a local owner node of the key range A1 26 that is responsible for maintaining mappings from keys to values for the keys within the key range A1 26. The key range A2 27 is assigned to the node A2 22 within the domain A 20. The node A2 22 is a local owner node of the key range A2 27 that is responsible for maintaining mappings from keys to values for the keys within the key range A2 27.

A node X in another domain that is responsible for the same key range as the local owner node of the key range is referred to as a remote owner node of the same key range. See FIG. 4C, supra, for an example of a local owner node and remote owner nodes.

Figure 2:
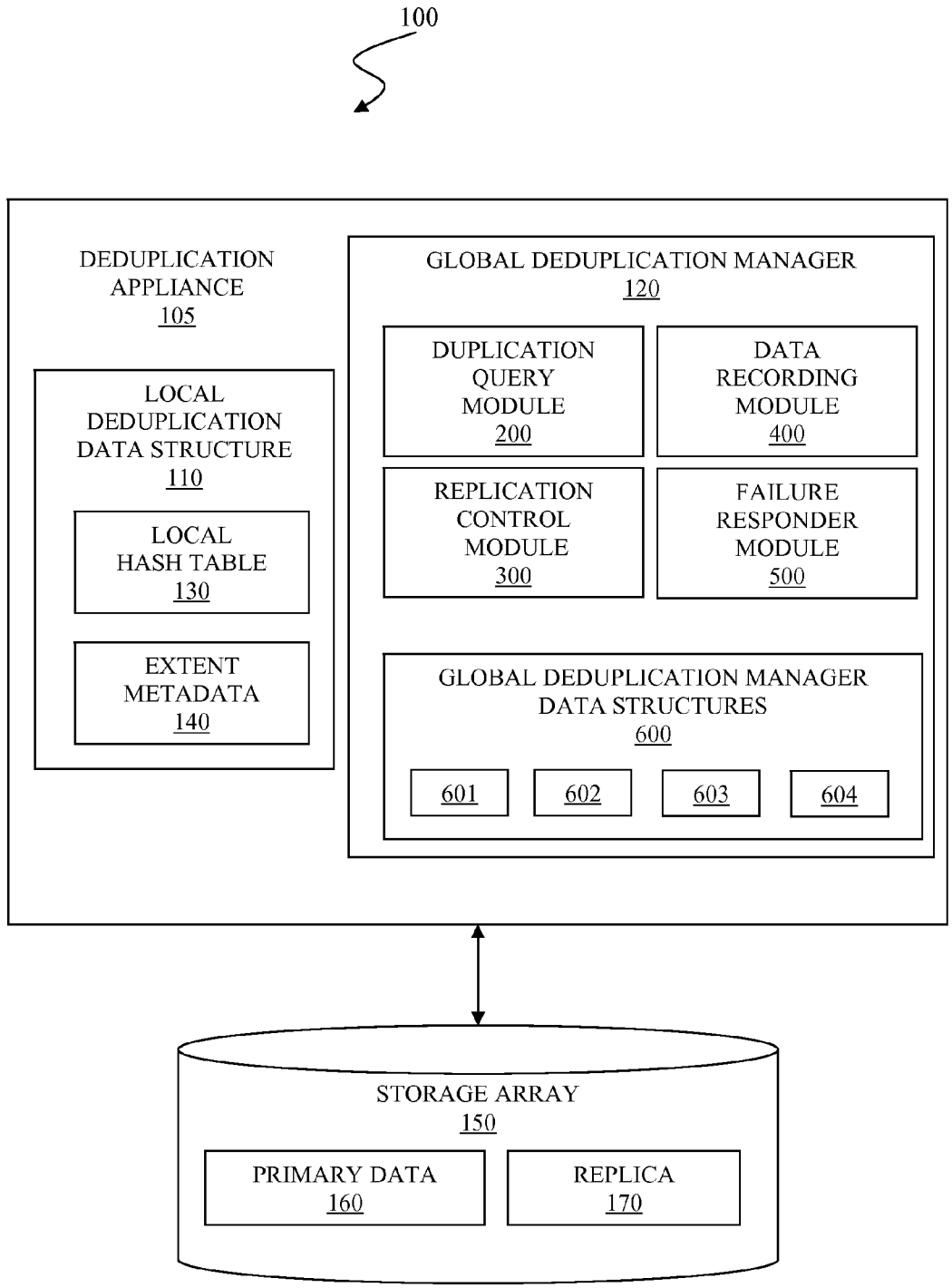
FIG. 2 illustrates a node of the system for data replication based on capacity optimization of FIG. 1, in accordance with embodiments of the present invention.

FIG. 2 illustrates a node 100 of the system 10 for data replication based on capacity optimization of FIG. 1, supra, in accordance with embodiments of the present invention.

The node 100 comprises a deduplication appliance 105 and a storage array 150. The deduplication appliance 105 comprises a local deduplication data structure 110 and a global deduplication manager 120.

The storage array 150 comprises a primary data 160 and a replica 170. The primary data 160 comprises extents that are original to the node 100. The replica area 170 comprises duplicates of extents for all nodes, including the node 100, in the system 10 of FIG. 1, supra.

The local deduplication data structure 110 comprises a local hash table 130 and extent metadata 140. The local hash table 130 is a lookup data structure comprising hash keys of extents of the primary data 160. The deduplication appliance 105 looks up the local hash table 130 to determine whether an extent having a specific hash key is stored in storage areas of the primary data 160. In this specification, the terms "local hash table", "local hash map", and "local deduplication hash map" are used interchangeably.

The extent metadata 140 is a data structure per file to keep track of reconstruction metadata. Examples of the extent metadata 140 are, inter alia, extent lists, inodes, etc. In this specification, the term "extent" is defined as a data unit for chunking and/or handling of data among deduplication appliances and storage arrays of all nodes. The extent lists describes how a file is partitioned into fields, respective length and offset of a field, etc. The inode is a data structure on a traditional UNIX® style file system that stores basic file system information about a regular file, directory, or other file system object. (UNIX is a registered trademark of The Open Group in the United States.)

The global deduplication manager 120 comprises a duplication query module 200, a replication control module 300, a data recording module 400, a failure responder module 500 and global deduplication manager data structures 600.

The duplication query module 200 determines whether a specific extent is globally unique using a combination of the local deduplication data structure 110 of the node, distributed hash tables from all domains, and Bloom filters in all global deduplication managers of each node in all domains. See descriptions of FIGS. 4A and 4B, infra, for steps of the duplication query module 200.

The replication control module 300 selects opportunistic replicas and performs load balancing among deduplication appliances based on various factors. See descriptions of FIG. 5, infra, for steps of the replication control module 300.

The data recording module 400 takes data into the node 100 by storing the data into the storage array 150 and set up data structures for the data. See descriptions of FIG. 6, infra, for steps of the data recording module 400.

The failure responder module 500 responds to a partial node failure that is detected by deduplication appliance 105. The failure responder module 500 reconstructs data in the node 100 wherein the partial node failure is local. The failure responder module 500 processes local extents that have been affected by the partial node failure wherein the partial node failure is remote. See descriptions of FIG. 7, infra, for steps of the failure responder module 500.

The global deduplication manager data structures 600 comprise a Bloom filter 601, a replication relationship metadata 602, a replication statistic data structure 603 and a replica hash table 604.

The Bloom filter 601 is a space-efficient probabilistic data structure that is used to test whether an element is a member of a set. In this specification the element is an extent and the set is a key range that is a segment of a hash key space of the distributed hash table of FIG. 1, supra. The Bloom filter 601 facilitates global deduplication of replicas scattered throughout the domains by indicating whether a domain has an opportunistic replica of an extent that is associated with a key within a key range. The Bloom filter 601 returns a result selected from {positive, negative}. The positive result indicates that the domain has an opportunistic replica of the extent. The negative result indicates that the domain does not have an opportunistic replica of the extent. The positive result of the Bloom filter 601 may be false due to the probabilistic nature of the data structure. Wherein there are more extents in a domain, the probability of false positives returned by the Bloom filter 601 increases.

The replication relationship metadata 602 comprises replica locations for each extent of the primary data 160.

The replication statistic data structure 603 describes locations and performance characteristics of all replicas of a new extent stored in nodes remote to the node 100, characteristics and states of remote nodes and the node 100.

The replica hash table 604 is a lookup data structure comprising hash keys of extent stored in storage areas for the replica 170. The global deduplication manager 120 determines whether a replica having a specific hash key exists in the node by looking up the replica hash table.

Figure 3:
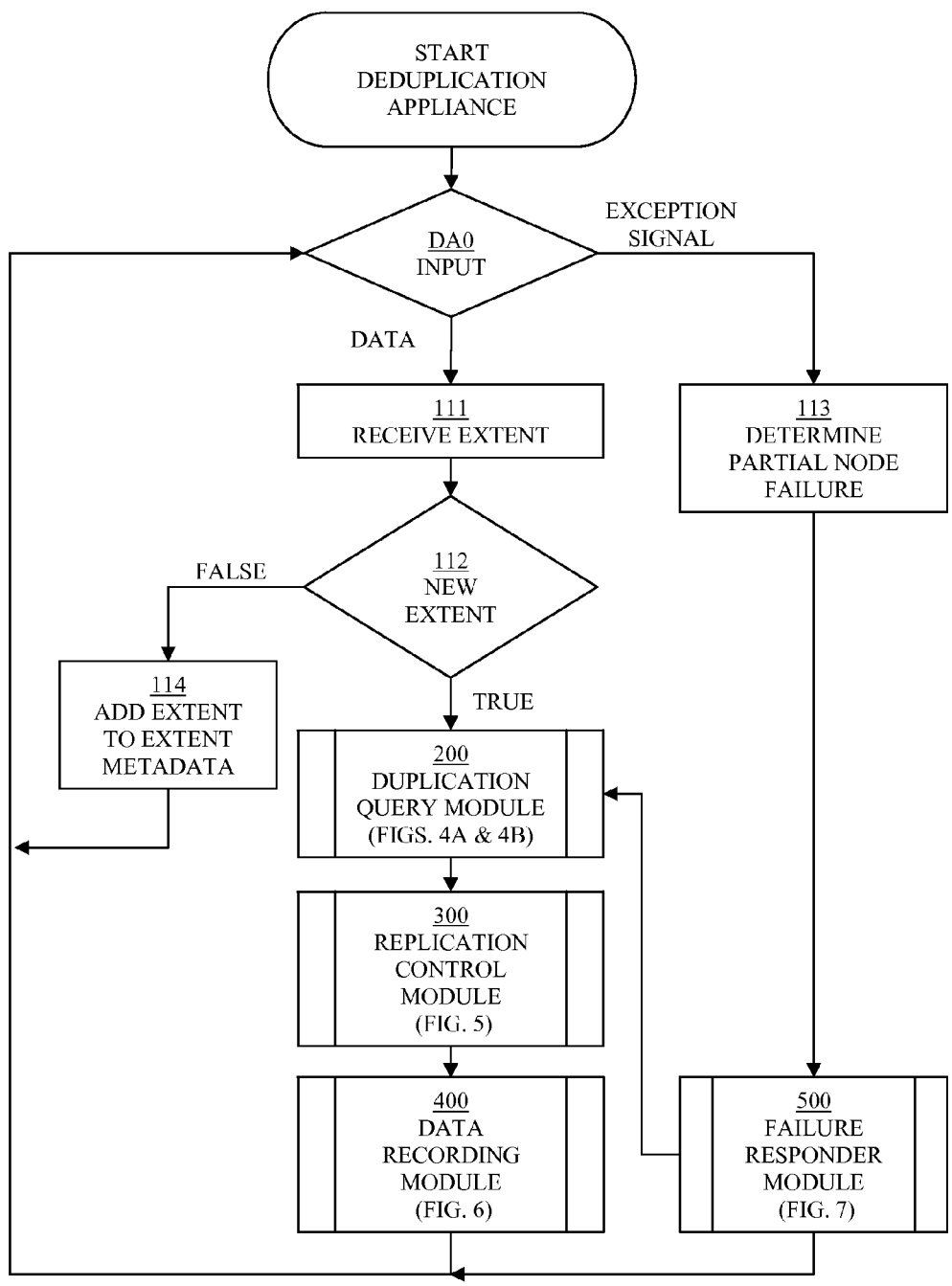
FIG. 3 is a flowchart depicting a method for the deduplication appliance, in accordance with the embodiments of the present invention.

FIG. 3 is a flowchart depicting a method for the deduplication appliance, in accordance with the embodiments of the present invention.

In step DA0, the deduplication appliance determines whether an input to a local node in which the deduplication appliance operates is data or an exception signal. If the deduplication appliance receives data comprising an extent, then the deduplication appliance proceeds with step 111. If the deduplication appliance receives an exception signal, then the deduplication appliance proceeds with step 113.

In step 111, the deduplication appliance receives the extent as incoming to the local node. The deduplication appliance proceeds with step 112.

In step 112, the deduplication appliance determines whether the extent is new to primary data of the local node by checking a local hash table of the local node. If the deduplication appliance determines that the extent is not new and already exists in the primary data of the local node, then the deduplication appliance performs local deduplication with use of the local deduplication data structure and proceeds with step 114. If the deduplication appliance determines that the extent is a new extent that does not exist in the primary data of the local node, then the deduplication appliance proceeds with step 200. In this specification, steps 200, 300 and 400 are referred to as a new extent processing cycle.

In one embodiment of the present invention, the extent is a file and the extent metadata of the local deduplication data structure is an extent list.

In step 114, the deduplication appliance adds the extent that already exists in primary data of the local node to an extent metadata for the extent and terminates processing the extent.

In step 200, the deduplication appliance of processes the extent with a duplication query module. See descriptions of FIGS. 4A and 4B, infra, for steps of the duplication query module. The deduplication appliance proceeds with step 300.

In step 300, the deduplication appliance processes the extent with a replication control module. See descriptions of FIG. 5, infra, for steps of the replication control module. The deduplication appliance proceeds with step 400.

In step 400, the deduplication appliance processes the extent with a data recording module. See descriptions of FIG. 6, infra, for steps of the data recording module. The deduplication appliance terminates processing the extent.

In step 113, the deduplication appliance determines whether the node failure signaled in step DA0 is partial. A node failure is partial wherein either primary data or replica of a node but not both had been corrupted by the node failure. If the deduplication appliance determines that the node failure is partial, then the deduplication appliance proceeds with step 500 to respond to the node failure. If the deduplication appliance determines that the node failure is complete wherein both primary data and replica of the node had been corrupted by the node failure, then the deduplication appliance terminates because the node failure must be responded by a disaster recovery system, which is not within the scope of the present invention.

In step 500, a failure responder module of the deduplication appliance recovers data corrupted by the partial node failure. See descriptions of FIG. 7, infra, for steps of the failure responder module. The deduplication appliance terminates handling the exception signal.

Figure 4A:
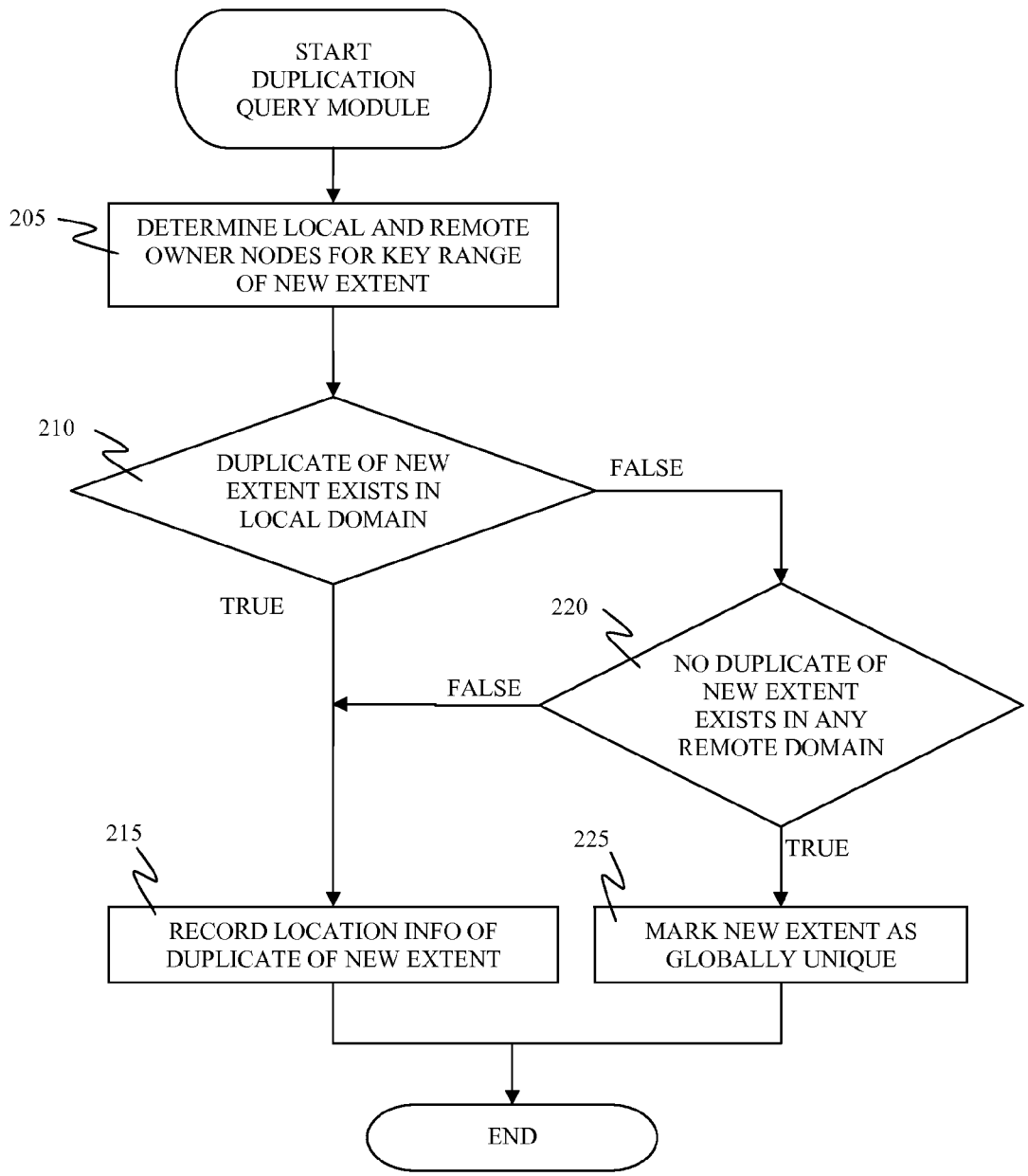
FIG. 4A is a first flowchart for the duplication query module of the deduplication appliance that records location information of duplicates in local or remote domains, in accordance with the embodiments of the present invention.

FIG. 4A is a first flowchart for the duplication query module of the deduplication appliance that records location information of duplicates in local or remote domains, in accordance with the embodiments of the present invention.

In step 205, the duplication query module determines a local owner node within a local domain and remote owner nodes of respective remote domains by examining a hash key of the new extent from step 112 of FIG. 3, supra, via distributed hash table (DHT) routing protocols. The hash key of the new extent falls within a key range of the distributed hash table that is associated with respective owner node. The local owner node and remote owner nodes are responsible for keeping extents that have hash keys within respective key ranges of the distributed hash table. The duplication query module proceeds with step 210.

In step 210, the duplication query module determines whether the local domain contains at least one duplicate of the new extent by utilizing the Bloom filter and replica hash tables of nodes in the local domain.

The duplication query module queries the Bloom filter value for the hash key of the new extent in the Bloom filter of the local owner node. If the Bloom filter of the local owner node indicates a hit for the Bloom filter value for the hash key of the new extent, the local owner node returns a positive result to the duplication query module. The positive result of the Bloom filter may be false and any duplicate of the new extent may not exist even if the local owner node returns the positive result. Thus upon receiving the positive result of the Bloom filter, the duplication query module verifies whether a duplicate actually exists by looking up the hash key of the new extent in replica hash tables of all nodes in the local domain.

If the duplication query module receives the positive result of the Bloom filter and subsequently discovers that the hash key of the new extent exists in any replica hash tables of nodes in the local domain, the duplication query module determines that the local domain contains at least one duplicate of the new extent and proceeds with step 215. If the hash key of the new extent does not exist in any replica hash tables of nodes in the local domain, even if the duplication query module receives the positive result of the Bloom filter, the duplication query module determines that the local domain does not contain any duplicate of the new extent and proceeds with step 220.

If the Bloom filter of the local owner node indicates a no-hit for the Bloom filter value for the hash key of the new extent, the local owner node returns a negative result to the duplication query module. The duplication query module consequently determines that the local domain does not contain any duplicate of the new extent and proceeds with step 220.

The size of the Bloom filter can be tuned. The size of the Bloom filter directly impacts the number of false positives in which the Bloom filter returns a hit when there is no extent matching the queried key. In order to minimize the rate of false positives, the number of hash functions to use (k) is calculated from [FORMULA 1], wherein a number of bits in the Bloom filter is m, and a number of unique extents in the system is n. The rate of false positives (FP) is calculated from [FORMULA 2].

$$k = \frac{m}{n} \times \ln 2 \quad \text{[FORMULA 1]}$$

$$FP = \left(1 - e^{\left(-\frac{kn}{m}\right)}\right)^k \quad \text{[FORMULA 2]}$$

For example, in one embodiment of the present invention, where there are 500 Million (m) bits in the Bloom filter and there are 100 Million (n) extents in the system, the number of hash functions to use (k) is 4 and the rate of false positives for the Bloom filter is less than 10%. With this embodiment, the deduplication appliance using a Bloom filter of 65 Megabytes can support up to 6.4 Terabytes (TB) in each node with average extent size of 64 Kilobytes with the rate of false positives below 10%.

In step 215, the duplication query module records respective location and performance characteristics of said at least one duplicate in the local domain or remote domains. Then the duplication query module terminates and the deduplication appliance proceeds with the replication control module.

In step 220, the duplication query module determines whether at least one duplicate of the new extent exists in a remote domain by utilizing the Bloom filter and replica hash tables of nodes in the remote domain. The duplication query module searches each remote domain for a duplicate of the new extent.

The duplication query module queries the Bloom filter value for the hash key of the new extent in the Bloom filter of a remote owner node. If the Bloom filter of the remote owner node indicates a hit for the Bloom filter value for the hash key of the new extent, the remote owner node returns a positive result to the duplication query module. As described in step 210, the positive result of the Bloom filter may be false and any duplicate of the new extent may not exist even if the remote owner node returns the positive result. Thus upon receiving the positive result of the Bloom filter, the duplication query module verifies whether a duplicate actually exists by looking up the hash key of the new extent in replica hash tables of all nodes in the remote domain.

If the duplication query module receives the positive result of the Bloom filter and subsequently discovers that the hash key of the new extent exists in any replica hash tables of nodes in the remote domain, the duplication query module determines that the remote domain contains at least one duplicate of the new extent and proceeds with step 215. If the hash key of the new extent does not exist in any replica hash tables of nodes in the remote domain, even if the duplication query module receives the positive result of the Bloom filter, the duplication query module determines that the remote domain does not contain any duplicate of the new extent and proceeds with next remote domain until all remote domains are examined for a duplicate.

If the Bloom filter of the remote owner node indicates a no-hit for the Bloom filter value for the hash key of the new extent, the remote owner node returns a negative result to the duplication query module. The duplication query module consequently determines that the remote domain does not contain any duplicate of the new extent and proceeds with next remote domain until all remote domains are examined for a duplicate.

Upon examining all remote domains without discovering a duplicate, the duplicate query module determines that no remote domain contain a duplicate of the new extent and proceeds with step 225.

In step 225, the duplication query module marks the new extent as globally unique indicating that the new extent does not have any duplicate whatsoever either in the local domain or in remote domains. Then the duplication query module terminates and the deduplication appliance proceeds with the replication control module.

Conventional methods to find out whether there is a duplicate are, inter alia, flooding a query to every node in all domains, maintaining a centralized hash table of all extents in a system, etc. Flooding is highly inefficient and the centralized hash table is not scalable. The deduplication query module of the present invention achieves efficiency by associating an owner node per domain with partitioned key range. The deduplication query module also achieves scalability by progressively expanding queries for a duplicate from the local domain to all remote domains.

Figure 4B:
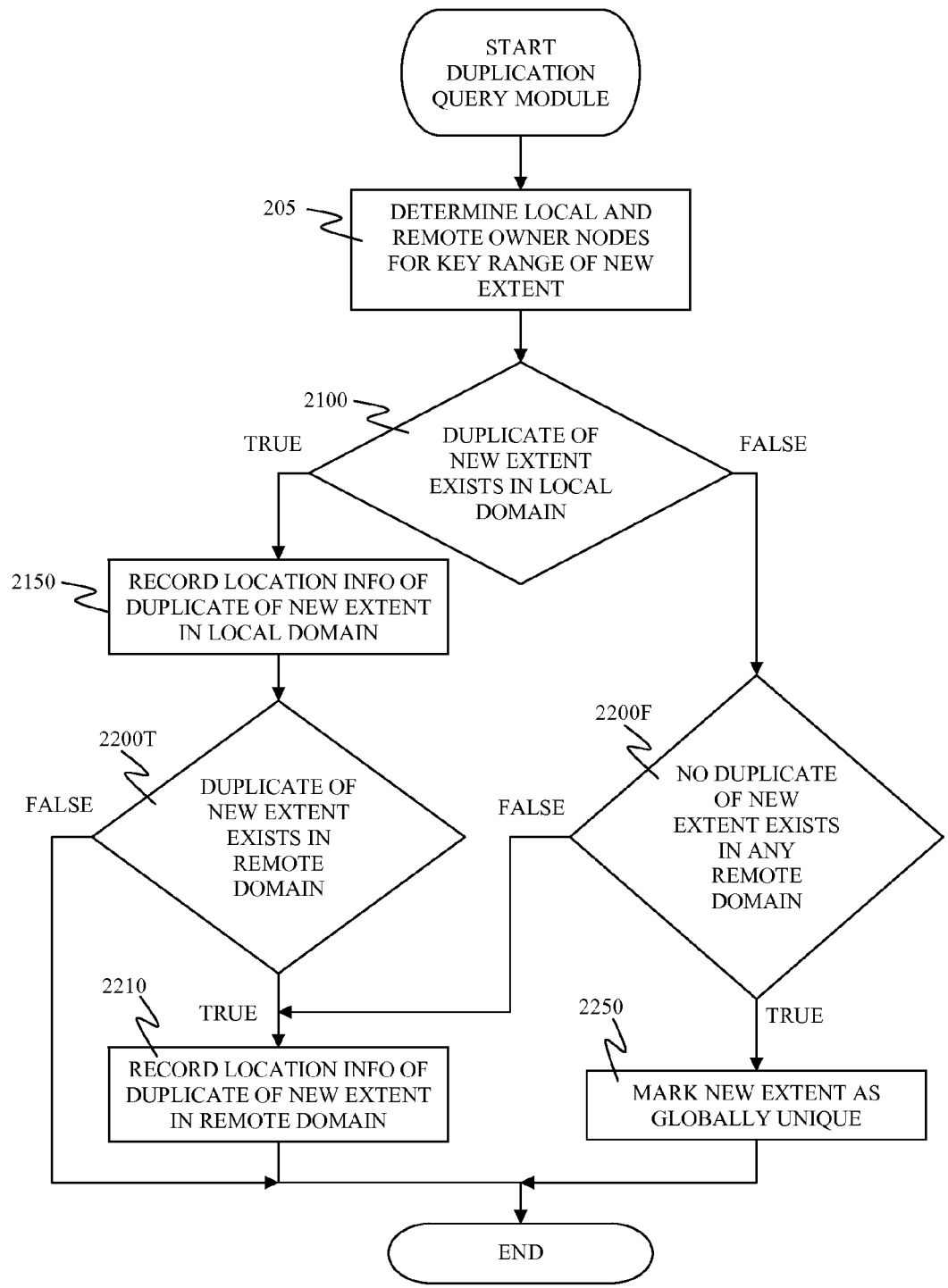
FIG. 4B is a second flowchart for the duplication query module of the deduplication appliance that records location information of duplicates in local and remote domains, in accordance with the embodiments of the present invention.

FIG. 4B is a second flowchart for the duplication query module of the deduplication appliance that records location information of duplicates in local and remote domains, in accordance with the embodiments of the present invention.

In this embodiment, the duplication query module examines the local domain and remote domains in an order for a duplicate of the new extent after performing step 205 of FIG. 4, supra.

In step 2100, the duplication query module determines whether a duplicate of the new extent exists in the local domain. The duplication query module performs step 2100 in a manner identical to step 210 of FIG. 4, supra. If the duplication query module determines that a duplicate of the new extent exists in the local domain, then the duplication query module proceeds with step 2150. If the duplication query module determines that a duplicate of the new extent does not exist in the local domain, then the duplication query module proceeds with step 2200F.

In step 2150, the duplication query module records respective location and performance characteristics of all duplicate extents in the local domain. The duplication query module proceeds with step 2200T.

In step 2200T, the duplication query module determines whether a duplicate of the new extent exists in remote domains. The duplication query module performs step 2200T in a manner identical to step 220 of FIG. 4, supra. If the duplication query module determines that a duplicate of the new extent exists in remote domains, then the duplication query module proceeds with step 2210. If the duplication query module determines that a duplicate of the new extent does not exist in remote domains, then the duplication query module terminates and the deduplication appliance proceeds with the replication control module.

In step 2210, the duplication query module records respective location and performance characteristics of all duplicate extents in the remote domains. Then the duplication query module terminates and the deduplication appliance proceeds with the replication control module.

In step 2200F, the duplication query module determines whether a duplicate of the new extent exists in remote domains. The duplication query module performs step 2200F in a manner identical to step 220 of FIG. 4, supra. If the duplication query module determines that a duplicate of the new extent exists in remote domains, then the duplication query module proceeds with step 2210. If the duplication query module determines that a duplicate of the new extent does not exist in remote domains, then the duplication query module proceeds with step 2250.

In step 2250, the duplication query module marks the new extent as globally unique indicating that the new extent does not have any duplicate whatsoever either in the local domain or in remote domains. Then the duplication query module terminates and the deduplication appliance proceeds with the replication control module.

Figure 4C:
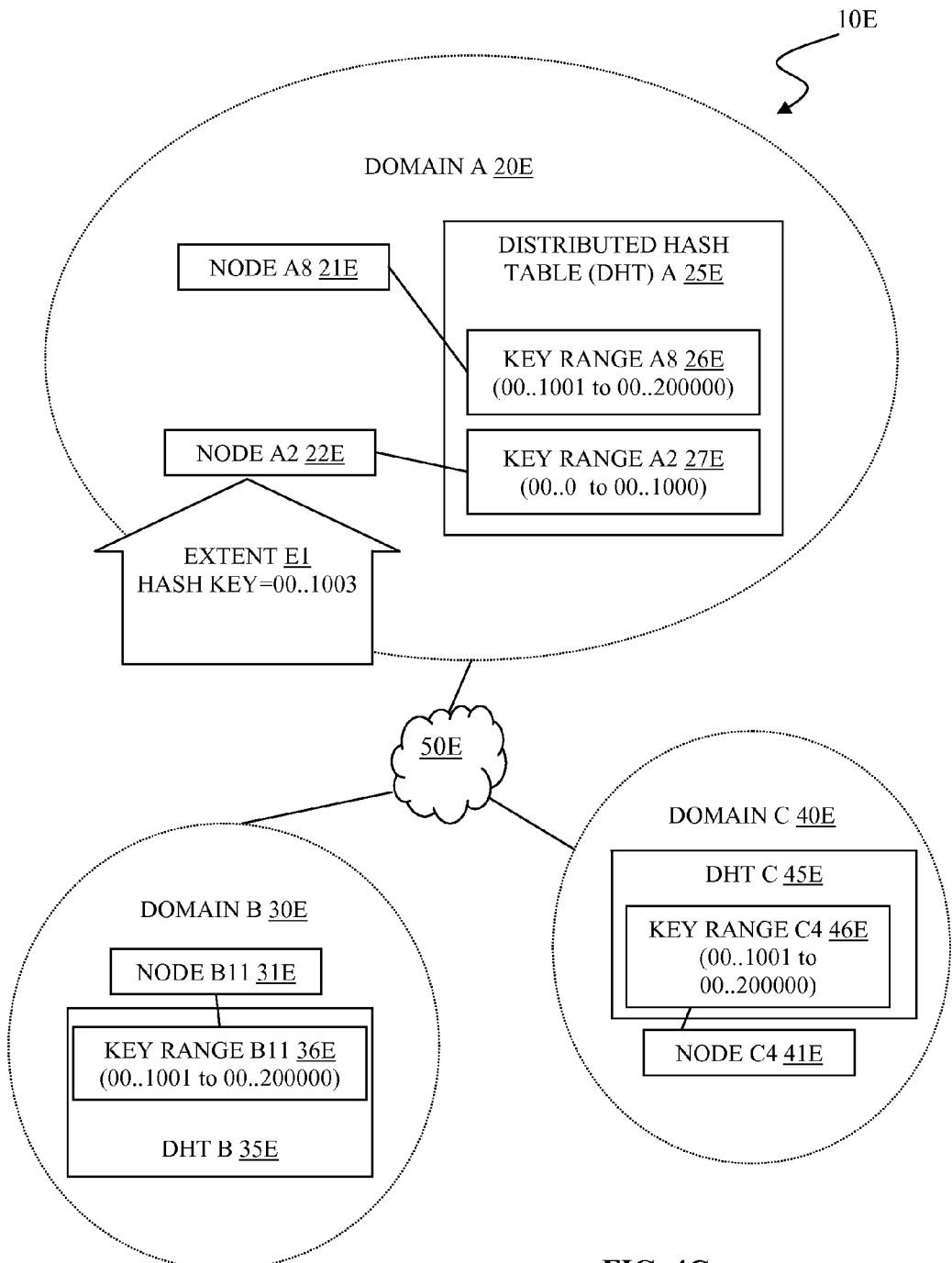
FIG. 4C is a system example configured to perform the first flowchart for the deduplication query module of FIG. 4, in accordance with the embodiments of the present invention.

FIG. 4C is a system example 10E configured to perform the first flowchart for the deduplication query module of FIG. 4, supra, in accordance with the embodiments of the present invention.

An extent E1 having a hash key 00 . . . 1003 is incoming to node A2 22E of domain A 20E. In step 205, the deduplication query module of node A2 22E determines that node A8 21E is a local owner node of the extent E1 because the hash key 00 . . . 1003 falls within a key range A8 26E (00 . . . 1001 to 00 . . . 200000) in distributed hash table (DHT) A 25E of domain A 20E. The deduplication query module of node A2 22E also determines that node B11 31E is a first remote owner node of the extent E1 in domain B 30E because the hash key 00 . . . 1003 falls within a key range B11 36E (00 . . . 1001 to 00 . . . 200000) in distributed hash table (DHT) B 35E of domain B 30E. The deduplication query module of node A2 22E further determines that node C4 41E is a second remote owner node of the extent E1 in domain C 40E because the hash key 00 . . . 1003 falls within a key range C4 46E (00 . . . 1001 to 00 . . . 200000) in distributed hash table (DHT) C 45E of domain C 40E.

In step 210, the deduplication query module of node A2 22E determines whether a duplicate of the extent E1 exists in domain A 20E in two substeps. First, the deduplication query module of node A2 22E queries the Bloom filter of node A8 21E and receives a positive result. Second, the deduplication query module of node A2 22E further looks up the hash key 00 . . . 1003 of the extent E1 in replica hash tables of all nodes of domain A 20E and receives a positive result indicating that a duplicate of the extent E1 actually exists in domain A 20E. Consequently, the deduplication query module of node A2 22E proceeds with step 215.

In step 215, the deduplication query module of node A2 22E records location information of all duplicate of the extent E10 discovered in domain A 20E where a replica contains the extent E10.

Wherein the deduplication query module of node A2 22E determines that a duplicate of the extent E1 does not exist in domain A 20E in step 210, the deduplication query module of node A2 22E proceeds with step 220.

In steps 220, for domain B 30E, the deduplication query module of node A2 22E queries the Bloom filter of node B11 31E and receives a positive result. The deduplication query module of node A2 22E further looks up the hash key 00 . . . 1003 of the extent E1 in replica hash tables of all nodes of domain B 30E and receives a negative result indicating that any duplicate of the extent E1 does not exists in domain B 30E.

In steps 220, for domain C 40E, the deduplication query module of node A2 22E also queries the Bloom filter of node C4 41E and receives a negative result indicating that any duplicate of the extent E1 does not exists in domain C 40E. Because neither domains B 30E nor domain C 40E has a duplicate of the extent E1, the deduplication query module of node A2 22E determines that no duplicate of the extent E1 exists in remote domains. Consequently, the deduplication query module of node A2 22E marks the extent E1 as globally unique in step 225 and terminates.

Figure 5:
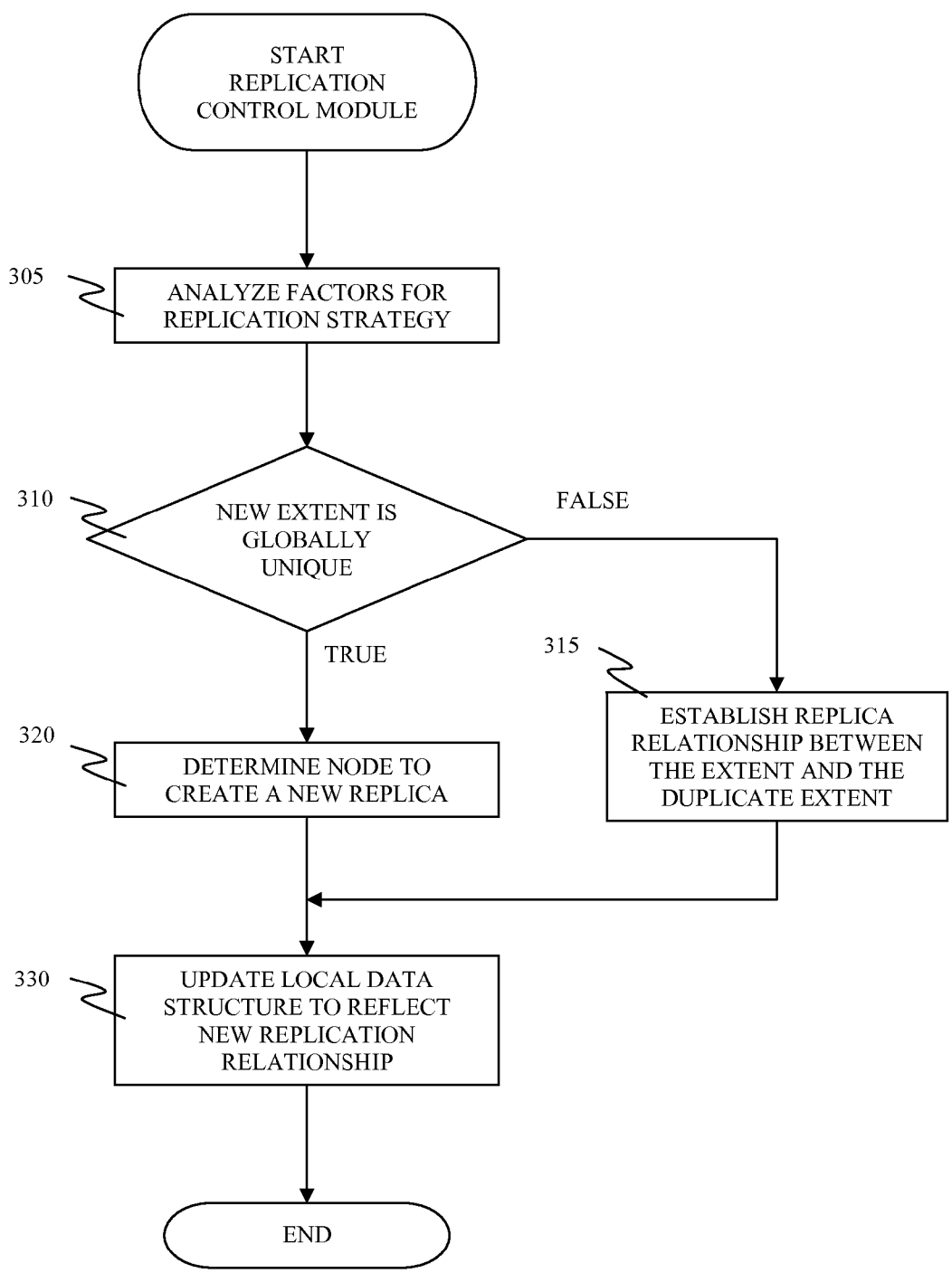
FIG. 5 is a flowchart for the replication control module of the deduplication appliance, in accordance with the embodiments of the present invention.

FIG. 5 is a flowchart for the replication control module of the deduplication appliance, in accordance with the embodiments of the present invention.

In step 305, the replication control module analyzes factors to determine a replication strategy that is selected from the group consisting of {establishing replica relationship, creating a new remote replica, creating a new local replica}. With the "establishing replica relationship" strategy, the replication control module establishes replica relationship among existing duplicates discovered by the deduplication appliance without creating a new replica.

The factors accounted in determining the replication strategy comprise administrative policies, replication statistic data, characteristics of remote replica nodes, and current state of a local owner node. The administrative policies are predefined to determine the replication strategy that meets performance, reliability, and/or cost objectives. The replication statistic data indicates information of extent characteristics. The extent characteristics comprise a local extent reference count, a remote extent reference count, a parent file locality. The local extent reference count and the remote extent reference count are indicators of both the popularity and the criticality of the extent. Higher reference counts indicate more critical data which can be associated with higher penalties in case of failure to service the extent. The characteristics of remote replica nodes comprise a remote node reliability estimate, a remote node response time, and the bandwidth connectivity across sites. The remote node response time and the remote node reliability estimate dictate the expected recovery time and data loss probability, respectively. The current state of the local owner node comprises amount of available space, storage cost, data criticality. The current state of the local owner node indicates the usage of various resources and need for minimizing replication costs.

The replication control module determines the replication strategy by applying the administrative policies to other factors. After performing step 305, the replication control module proceeds with step 310.

In step 310, the replication control module determines whether the new extent is globally unique or a duplicate of the new extent exists by using a result from the duplicate query module. If the replication control module determines that a duplicate of the new extent exists, then the replication control module proceeds with step 315. If the replication control module determines that the new extent is globally unique as determined by the duplication query module either in step 225 of FIG. 4A or in step 2250 of FIG. 4B, supra, then the replication control module proceeds with step 320.

In step 315, because a duplicate of the new extent exists, the replication control module establishes a replica relationship between the new extent and the duplicate without creating a new replica or creates at least one new replica for the new extent based on the factors for determining the replication strategy in step 305 supra. The replica relationship comprising the location information of the duplicate of the new extent is maintained in the replication relationship metadata and used as an alternative access to the new extent in cases of partial node failures. The replication control module subsequently proceeds with step 330.

In step 320, because the extent is globally unique as determined by the duplication query module, the replication control module determines at least one node in which a replica is to be created. The replica is created locally or in other nodes based on the factors for determining the replication strategy in step 305 supra. In one embodiment of the present invention, the replication control module employs a load-balancing algorithm to decide a node and a domain in which the replica should be made. The replication control module subsequently proceeds with step 330.

In step 330, the replication control module updates the replication relationship metadata to reflect changes in replica relationships. The replication control module updates the Bloom filters that are used as a summary of replica extents. After performing step 330, the replication control module terminates and the deduplication appliance proceeds with the data recording module.

Figure 6:
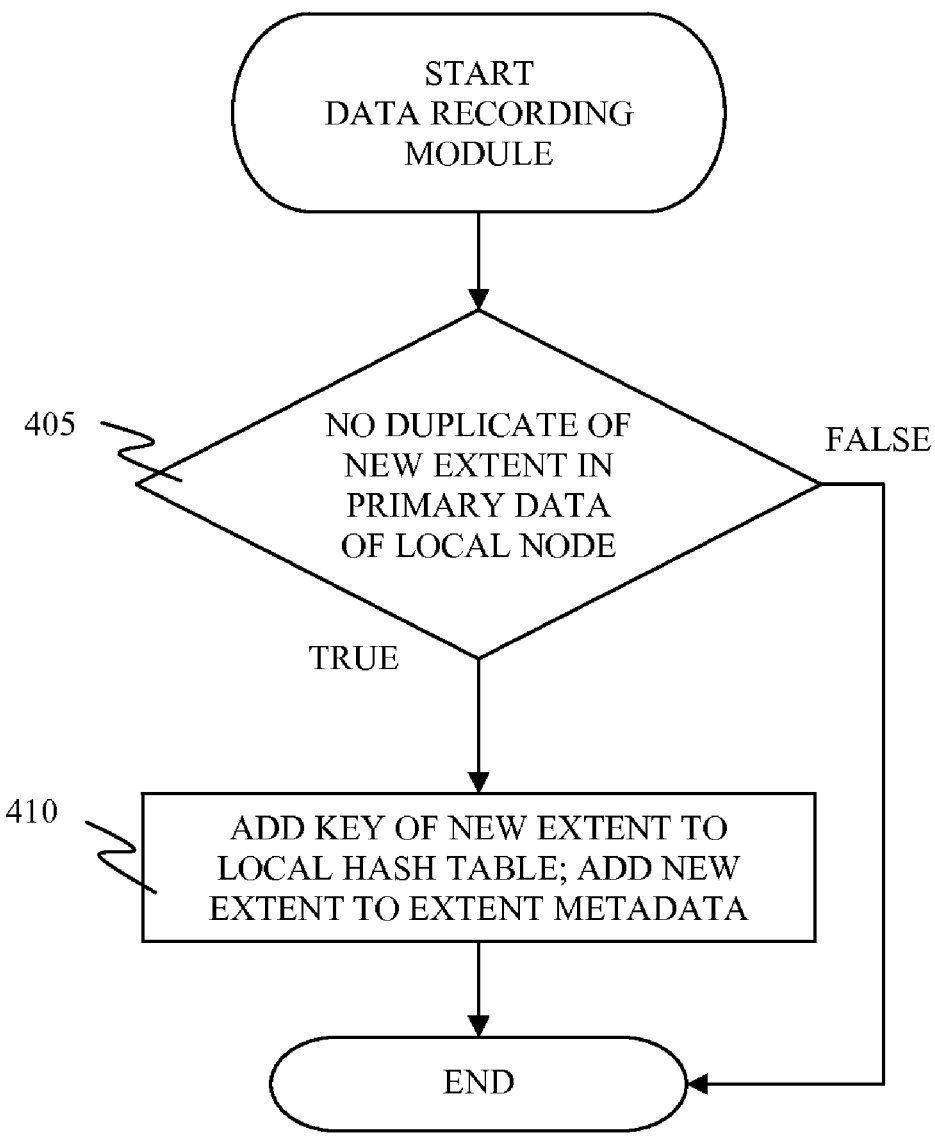
FIG. 6 is a flowchart for the data recording module of the deduplication appliance, in accordance with the embodiments of the present invention.

FIG. 6 is a flowchart for the data recording module of the deduplication appliance, in accordance with the embodiments of the present invention.

In step 405, the data recording module determines whether the new extent that is unique in the primary data of the local node. In one embodiment of the present invention, a primary data and a replica in each node are not identical. The data recording module handles the new extent wherein the new extent does not exist in the primary data of the local node. The new extent may already exist in the replica of the local node but does not exist in the primary data of the local node wherein a second node has the new extent in a primary data of the second node and use the local node to replicate the new extent. Thus the data recording module examines the primary data for the new extent. If the data recording module determines that the new extent is unique in the primary data of the local node, then the data recording module proceeds with step 410. If the data recording module determines that the new extent is not unique in the primary data of the local node, then the data recording module terminates. The deduplication appliance subsequently terminates processing the new extent.

In step 410, the data recording module adds a hash key of the new extent to the local hash table and updates the extent metadata for the new extent. The data recording module subsequently terminates processing the new extent.

Figure 7:
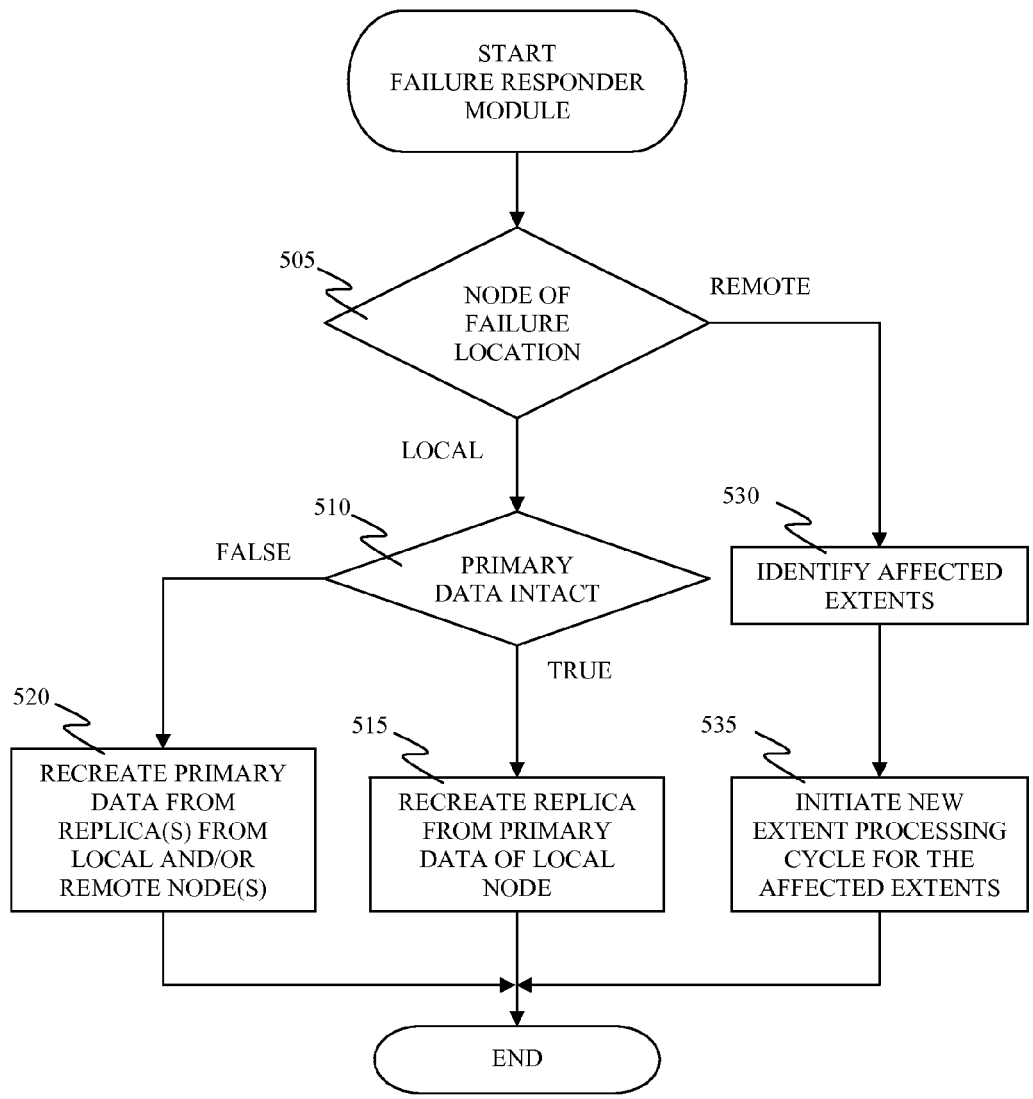
FIG. 7 is a flowchart for the failure responder module of the deduplication appliance, in accordance with the embodiments of the present invention.

FIG. 7 is a flowchart for the failure responder module of the deduplication appliance, in accordance with the embodiments of the present invention.

In step 505, the failure responder module determines a node in which a partial node failure detected in step 113 of FIG. 3, supra, had occurred. If the failure responder module determines that the partial node failure had occurred in a local node in which the deduplication appliance operates, then the failure responder module proceeds with step 510. If the failure responder module determines that the partial node failure had occurred in a remote node other than the local node, then the failure responder module proceeds with step 530.

In step 510, wherein the partial node failure occurred in the local node, the failure responder module determines whether the primary data of the local node is not corrupted by the partial node failure. If the failure responder module determines that the primary data of the local node is intact, then the failure responder module proceeds with step 515. If the failure responder module determines that the primary data of the local node is corrupted, then the failure responder module proceeds with step 520.

In step 515, because the primary data is intact and the replica is corrupted by the partial node failure of the local node, the failure responder module recreates a new replica from the primary data of the local node based on replication relationship metadata. The failure responder module subsequently terminates.

In step 520, because the primary data is corrupted by the partial node failure of the local node, the failure responder module recreates the primary data based on the replication relationship metadata, replica in the local node, and/or replicas in remote nodes. The failure responder module subsequently terminates.

In step 530, wherein the partial node failure occurred in a remote node, the failure responder module identifies extents in the local node that had been affected by the partial failure occurred in the remote node by examining replication relationship metadata of the local node. The failure responder module subsequently proceeds with step 535.

In step 535, the failure responder module initiates a new extent processing cycle of FIG. 3, supra, for the extents affected by the partial node failure within the deduplication appliance. Each affected extent of the affected extents is processed to find duplicates or to create a new replica wherein there is no duplicate of said each affected extent. The failure responder module subsequently terminates.

Figure 8:
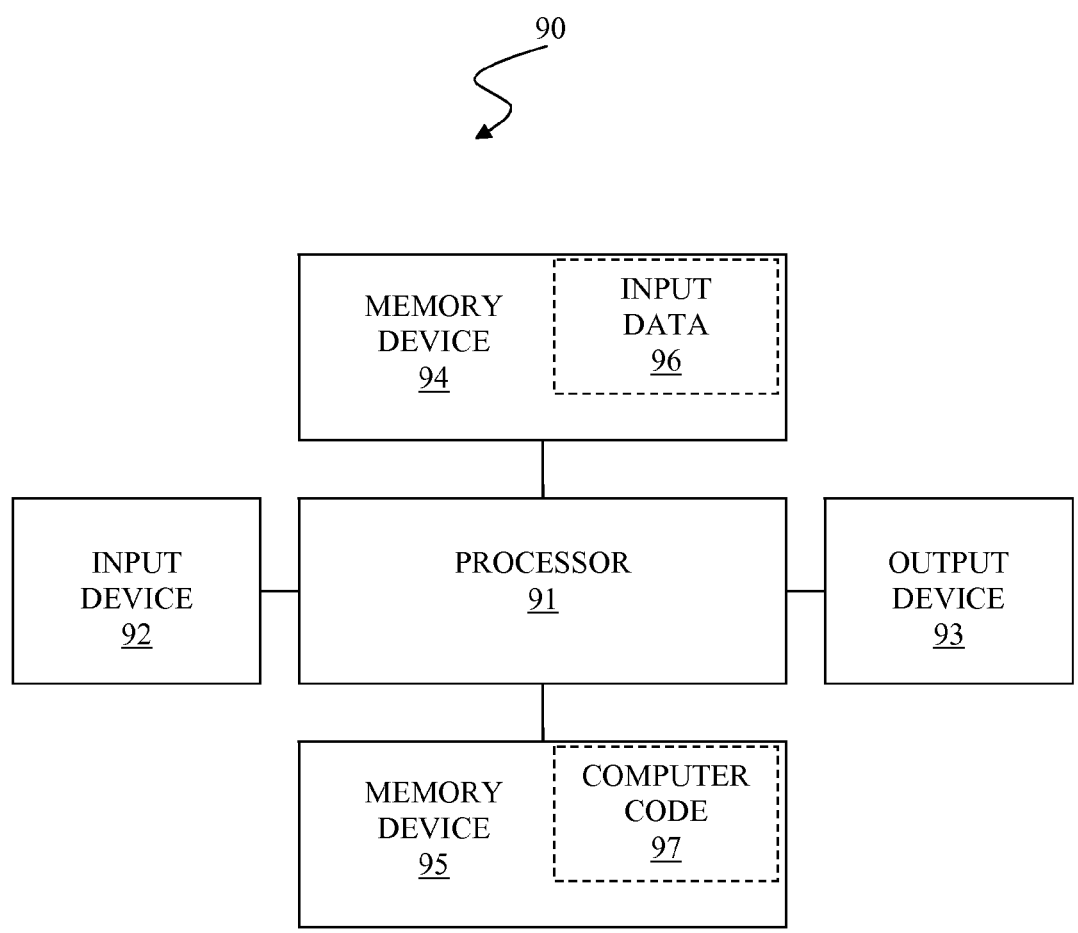
FIG. 8 illustrates a computer system used for data replication based on opportunistic deduplication, in accordance with the embodiments of the present invention.

FIG. 8 illustrates a computer system 90 used for data replication based on opportunistic deduplication, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for data replication based on opportunistic deduplication according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for data replication based on opportunistic deduplication.

In another embodiment, the invention provides a business method that performs the process steps of the invention on a subscription, advertising and/or fee basis. That is, a service provider, such as a Solution Integrator, can offer to create, maintain, support, etc. a process for determining web analytics information of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with a system, apparatus, or device that executes instructions.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, run substantially concurrently, or the blocks may sometimes run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for replicating data based on capacity optimization, said method comprising:
    a local node receiving the data in an extent configured for a system, the extent being associated with a key for indexing, wherein the system comprises at least one domain coupled to a communication network, wherein each domain of said at least one domain comprises at least one node and a respective distributed hash table (DHT) for said each domain, wherein each node of said at least one node comprises a respective storage array storing respective primary data and respective replicas of selected data stored in the respective primary data of said at least one node;

determining, by a processor of a computer in which the local node operates, that the received extent does not exist in primary data of the local node;

querying said at least one domain in the system for a duplicate of the extent by use of the respective DHT for said each domain such that only a respective owner node is queried for the duplicate of the extent within said each domain, wherein the respective owner node of said each domain owns a key range in which the key associated with the extent falls in;

determining a replication strategy based on factors and a result from said querying, wherein said replication strategy is selected from the group consisting of establishing replica relationship among existing duplicates, creating a new remote duplicate, and creating a new local duplicate; and recording the extent into said primary data of the local node by updating a local hash table and extent metadata of the local node.

2. The method of claim 1, wherein said at least one node further comprises a respective failure responder module that is configured to respond to a partial node failure in steps comprising:

determining that the partial node failure has occurred in the local node; and responsive to said determining, recreating an extent corrupted by the partial node failure in the local node from at least one existing duplicate of the extent, wherein said at least one existing duplicate is stored in any node in said at least one domain.

3. The method of claim 2, wherein said respective failure responder module further comprising:

determining that the partial node failure has occurred in a remote node;

responsive to said determining, identifying at least one affected extent in the local node; and initiating a new extent processing cycle for said at least one affected extent, wherein said new extent processing cycle comprises said querying, said determining the replication strategy, and said recording the extent.

4. The method of claim 1, said querying said at least one domain comprising:

querying a local owner node of the key range for the duplicate of the extent, wherein the local owner node is an owner node in a local domain of said at least one domain, and wherein the local node is a member to the local domain;

responsive to said querying the local owner node, receiving from the local owner node a first negative result indicating that the duplicate of the extent does not exist in the local domain;

querying each remote owner node of the key range for the duplicate of the extent, wherein said each remote owner node is a respective owner node in a respective remote domain of said at least one domain;

responsive to said querying said each remote owner node, receiving from said each remote owner node a respective negative result indicating that the duplicate of the extent does not exist in the respective remote domain; and responsive to said receiving from the local owner node the first negative result and said receiving from said each remote owner node the respective negative result, marking the extent as unique in said at least one domain.

5. The method of claim 1, said querying said at least one domain comprising:

querying a local owner node of the key range for the duplicate of the extent, and subsequently querying each remote owner node of the key range for the duplicate of the extent, wherein the local owner node is an owner node in a local domain of said at least one domain, wherein the local node is a member to the local domain, and wherein said each remote owner node is a respective owner node in a respective remote domain of said at least one domain;

responsive to said querying the local owner node and subsequently querying said each remote owner node, receiving from queried owner node at least one positive result indicating that at least one duplicate of the extent exists in a respective domain corresponding to the queried owner node; and recording respective location information of said at least one duplicate of the extent in the respective domain.

6. A computer program product comprising:

a computer readable storage medium having a computer readable program code embodied therein, said computer readable program code containing instructions that perform replicating data based on capacity optimization, said replicating comprising:

a local node receiving the data in an extent configured for a system, the extent being associated with a key for indexing, wherein the system comprises at least one domain coupled to a communication network, wherein each domain of said at least one domain comprises at least one node and a respective distributed hash table (DHT) for said each domain, wherein each node of said at least one node comprises a respective storage array storing respective primary data and respective replicas of selected data stored in the respective primary data of said at least one node;

determining that the received extent does not exist in primary data of the local node;

querying said at least one domain in the system for a duplicate of the extent by use of the respective DHT for said each domain such that only a respective owner node is queried for the duplicate of the extent within said each domain, wherein the respective owner node of said each domain owns a key range in which the key associated with the extent falls in;

determining a replication strategy based on factors and a result from said querying, wherein said replication strategy is selected from the group consisting of establishing replica relationship among existing duplicates, creating a new remote duplicate, and creating a new local duplicate; and recording the extent into said primary data of the local node by updating a local hash table and extent metadata of the local node.

7. The computer program product of claim 6, wherein said at least one node further comprises a respective failure responder module that is configured to respond to a partial node failure in steps comprising:

determining that the partial node failure has occurred in the local node; and responsive to said determining, recreating an extent corrupted by the partial node failure in the local node from at least one existing duplicate of the extent, wherein said at least one existing duplicate is stored in any node in said at least one domain.

8. The computer program product of claim 7, wherein said respective failure responder module further comprising:

determining that the partial node failure has occurred in a remote node;

responsive to said determining, identifying at least one affected extent in the local node; and initiating a new extent processing cycle for said at least one affected extent, wherein said new extent processing cycle comprises said querying, said determining the replication strategy, and said recording the extent.

9. The computer program product of claim 6, said querying said at least one domain comprising:
querying a local owner node of the key range for the duplicate of the extent, wherein the local owner node is an owner node in a local domain of said at least one domain, and wherein the local node is a member to the local domain;
responsive to said querying the local owner node, receiving from the local owner node a first negative result indicating that the duplicate of the extent does not exist in the local domain;
querying each remote owner node of the key range for the duplicate of the extent, wherein said each remote owner node is a respective owner node in a respective remote domain of said at least one domain;
responsive to said querying said each remote owner node, receiving from said each remote owner node a respective negative result indicating that the duplicate of the extent does not exist in the respective remote domain; and
responsive to said receiving from the local owner node the first negative result and said receiving from said each remote owner node the respective negative result, marking the extent as unique in said at least one domain.

10. The computer program product of claim 6, said querying said at least one domain comprising:
querying a local owner node of the key range for the duplicate of the extent, and subsequently querying each remote owner node of the key range for the duplicate of the extent, wherein the local owner node is an owner node in a local domain of said at least one domain, wherein the local node is a member to the local domain, and wherein said each remote owner node is a respective owner node in a respective remote domain of said at least one domain;
responsive to said querying the local owner node and subsequently querying said each remote owner node, receiving from queried owner node at least one positive result indicating that at least one duplicate of the extent exists in a respective domain corresponding to the queried owner node; and
recording respective location information of said at least one duplicate of the extent in the respective domain.

11. A computer system comprising a processor and a computer readable memory unit coupled to the processor, said computer readable memory unit containing instructions that when run by the processor implement a method for replicating data based on capacity optimization, said method comprising:
a local node receiving the data in an extent configured for a system, the extent being associated with a key for indexing, wherein the system comprises at least one domain coupled to a communication network, wherein each domain of said at least one domain comprises at least one node and a respective distributed hash table (DHT) for said each domain, wherein each node of said at least one node comprises a respective storage array storing respective primary data and respective replicas of selected data stored in the respective primary data of said at least one node;
determining that the received extent does not exist in primary data of the local node;
querying said at least one domain in the system for a duplicate of the extent by use of the respective DHT for said each domain such that only a respective owner node is queried for the duplicate of the extent within said each domain, wherein the respective owner node of said each domain owns a key range in which the key associated with the extent falls in;
determining a replication strategy based on factors and a result from said querying, wherein said replication strategy is selected from the group consisting of establishing replica relationship among existing duplicates, creating a new remote duplicate, and creating a new local duplicate; and
recording the extent into said primary data of the local node by updating a local hash table and extent metadata of the local node.

12. The computer system of claim 11, wherein said at least one node further comprises a respective failure responder module that is configured to respond to a partial node failure in steps comprising:
determining that the partial node failure has occurred in the local node; and
responsive to said determining, recreating an extent corrupted by the partial node failure in the local node from at least one existing duplicate of the extent, wherein said at least one existing duplicate is stored in any node in said at least one domain.

13. The computer system of claim 12, wherein said respective failure responder module further comprising:
determining that the partial node failure has occurred in a remote node;
responsive to said determining, identifying at least one affected extent in the local node; and
initiating a new extent processing cycle for said at least one affected extent, wherein said new extent processing cycle comprises said querying, said determining the replication strategy, and said recording the extent.

14. The computer system of claim 11, said querying said at least one domain comprising:
querying a local owner node of the key range for the duplicate of the extent, wherein the local owner node is an owner node in a local domain of said at least one domain, and wherein the local node is a member to the local domain;
responsive to said querying the local owner node, receiving from the local owner node a first negative result indicating that the duplicate of the extent does not exist in the local domain;
querying each remote owner node of the key range for the duplicate of the extent, wherein said each remote owner node is a respective owner node in a respective remote domain of said at least one domain;
responsive to said querying said each remote owner node, receiving from said each remote owner node a respective negative result indicating that the duplicate of the extent does not exist in the respective remote domain; and
responsive to said receiving from the local owner node the first negative result and said receiving from said each remote owner node the respective negative result, marking the extent as unique in said at least one domain.

15. The computer system of claim 11, said querying said at least one domain comprising:
querying a local owner node of the key range for the duplicate of the extent, and subsequently querying each remote owner node of the key range for the duplicate of the extent, wherein the local owner node is an owner node in a local domain of said at least one domain, wherein the local node is a member to the local domain, and wherein said each remote owner node is a respective owner node in a respective remote domain of said at least one domain;

responsive to said querying the local owner node and subsequently querying said each remote owner node, receiving from queried owner node at least one positive result indicating that at least one duplicate of the extent exists in a respective domain corresponding to the queried owner node; and recording respective location information of said at least one duplicate of the extent in the respective domain.

16. A machine-executable process for supporting computer infrastructure, said process embodied in a computer-readable storage medium comprising: providing at least one support service for at least one of creating, integrating, hosting, maintaining, and deploying computer-readable code in a computing system, wherein the code in combination with the computing system is capable of performing a method for replicating data based on capacity optimization, said method comprising:

a local node receiving the data in an extent configured for a system, the extent being associated with a key for indexing, wherein the system comprises at least one domain coupled to a communication network, wherein each domain of said at least one domain comprises at least one node and a respective distributed hash table (DHT) for said each domain, wherein each node of said at least one node comprises a respective storage array storing respective primary data and respective replicas of selected data stored in the respective primary data of said at least one node;

determining that the received extent does not exist in primary data of the local node;

querying said at least one domain in the system for a duplicate of the extent by use of the respective DHT for said each domain such that only a respective owner node is queried for the duplicate of the extent within said each domain, wherein the respective owner node of said each domain owns a key range in which the key associated with the extent falls in;

determining a replication strategy based on factors and a result from said querying, wherein said replication strategy is selected from the group consisting of establishing replica relationship among existing duplicates, creating a new remote duplicate, and creating a new local duplicate; and recording the extent into said primary data of the local node by updating a local hash table and extent metadata of the local node.

17. The process of claim 16, wherein said at least one node further comprises a respective failure responder module that is configured to respond to a partial node failure in steps comprising:

determining that the partial node failure has occurred in the local node; and responsive to said determining, recreating an extent corrupted by the partial node failure in the local node from at least one existing duplicate of the extent, wherein said at least one existing duplicate is stored in any node in said at least one domain.

18. The process of claim 17, wherein said respective failure responder module further comprising:

determining that the partial node failure has occurred in a remote node;

responsive to said determining, identifying at least one affected extent in the local node; and initiating a new extent processing cycle for said at least one affected extent, wherein said new extent processing cycle comprises said querying, said determining the replication strategy, and said recording the extent.

19. The process of claim 16, said querying said at least one domain comprising:

querying a local owner node of the key range for the duplicate of the extent, wherein the local owner node is an owner node in a local domain of said at least one domain, and wherein the local node is a member to the local domain;

responsive to said querying the local owner node, receiving from the local owner node a first negative result indicating that the duplicate of the extent does not exist in the local domain;

querying each remote owner node of the key range for the duplicate of the extent, wherein said each remote owner node is a respective owner node in a respective remote domain of said at least one domain;

responsive to said querying said each remote owner node, receiving from said each remote owner node a respective negative result indicating that the duplicate of the extent does not exist in the respective remote domain; and responsive to said receiving from the local owner node the first negative result and said receiving from said each remote owner node the respective negative result, marking the extent as unique in said at least one domain.

20. The process of claim 16, said querying said at least one domain comprising:

querying a local owner node of the key range for the duplicate of the extent, and subsequently querying each remote owner node of the key range for the duplicate of the extent, wherein the local owner node is an owner node in a local domain of said at least one domain, wherein the local node is a member to the local domain, and wherein said each remote owner node is a respective owner node in a respective remote domain of said at least one domain;

responsive to said querying the local owner node and subsequently querying said each remote owner node, receiving from queried owner node at least one positive result indicating that at least one duplicate of the extent exists in a respective domain corresponding to the queried owner node; and recording respective location information of said at least one duplicate of the extent in the respective domain.

* * * * *